US009277442B2

(12) United States Patent
Praveenkumar et al.

(10) Patent No.: US 9,277,442 B2
(45) Date of Patent: *Mar. 1, 2016

(54) MULTIPLE CONCURRENT DATA LINK MANAGEMENT

(71) Applicant: BlackBerry Limited, Waterloo (CA)

(72) Inventors: Sanigepalli V. Praveenkumar, San Diego, CA (US); Ritwik Dubey, Gainesville, FL (US); Manish Bansal, Sunrise, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/535,515

(22) Filed: Nov. 7, 2014

(65) Prior Publication Data

US 2015/0063114 A1    Mar. 5, 2015

Related U.S. Application Data

(63) Continuation of application No. 13/307,601, filed on Nov. 30, 2011, now Pat. No. 8,885,584.

(51) Int. Cl.
*H04W 28/02* (2009.01)
*H04W 76/02* (2009.01)
*H04W 88/06* (2009.01)

(52) U.S. Cl.
CPC ........ *H04W 28/0231* (2013.01); *H04W 76/026* (2013.01); *H04W 88/06* (2013.01)

(58) Field of Classification Search
CPC . H04W 28/02; H04W 28/0231; H04W 28/04; H04W 4/00; H04W 28/0236
See application file for complete search history.

(56) References Cited

U.S. PATENT DOCUMENTS

| 6,009,087 | A  | 12/1999 | Uchida et al. |
| 6,643,292 | B2 | 11/2003 | Chapman et al. |
| 6,959,327 | B1 | 10/2005 | Vogl et al. |
| 7,046,989 | B2 | 5/2006 | Karaoguz et al. |

(Continued)

FOREIGN PATENT DOCUMENTS

WO    WO2010063119    6/2010

OTHER PUBLICATIONS

WO 2010/063119 A1 Title: Multi-Transport Mode Devices Having Improved Data Throughput Inventor: Tajinder Manku Priority Date: Dec. 4, 2008.*
Yin, Chingjiang, et al., "Convergence Manager: Mapping Services to Standards." Dec. 22, 2003, pp. 1-97, XP002674812.

(Continued)

*Primary Examiner* — Jung Park
*Assistant Examiner* — Leon Andrews
(74) *Attorney, Agent, or Firm* — Jeffrey N. Giunta; Fleit Gibbons Gutman Bongini & Bianco P.L.

(57) ABSTRACT

An apparatus and method of determining an allocation of data across multiple data communications networks. A respective characteristic of the first data communications network and the second data communication network are determined based on receiving a respective first and second portion of a data set sent through respective channels to a receiver. Based on determining these respective characteristics and based upon the respective characteristics, an allocation of data between the first data communications network and the second communications network is determined such that the allocation satisfies at least one data transfer performance requirement associated with the data set.

20 Claims, 6 Drawing Sheets

(56) References Cited

U.S. PATENT DOCUMENTS

| | | |
|---|---|---|
| 7,051,083 B1 | 5/2006 | Graf et al. |
| 7,224,964 B2 | 5/2007 | Souissi et al. |
| 7,305,474 B2 | 12/2007 | Giaffreda et al. |
| 7,346,025 B2 | 3/2008 | Bryson |
| 7,539,175 B2 | 5/2009 | White et al. |
| 7,894,505 B2 | 2/2011 | Zhou et al. |
| 7,921,225 B2 | 4/2011 | Bonefas et al. |
| 2001/0012288 A1 | 8/2001 | Yu |
| 2002/0075542 A1 | 6/2002 | Kumar et al. |
| 2005/0105552 A1 | 5/2005 | Osterling |
| 2006/0056405 A1 | 3/2006 | Chang et al. |
| 2008/0107053 A1 | 5/2008 | Kim et al. |
| 2008/0317007 A1 | 12/2008 | Chaar et al. |
| 2010/0027493 A1 | 2/2010 | Dinulescu et al. |
| 2010/0260241 A1 | 10/2010 | Kim |
| 2010/0296476 A1 | 11/2010 | Li et al. |

OTHER PUBLICATIONS

Ferreira, L., et al., "Concepts of Simultaneous Use in Mobile and Wireless Communications," Wireless Personal Communications, Springer, Dordrecht, NL, vol. 37, No. 3/04, May 1, 2006, pp. 317-328, XP001501696, ISSN: 0929-6212, DOI: 10.1007/S11277-006-9045-6.

Extended European Search Report dated May 10, 2012 for Application No. EP11191415.

Julian Chesterfield, et al., "Exploiting Diversity to Enhance Multimedia Streaming Over Cellular Links", Proceedings of the IEEE INFOCOM, 2005, pp. 1-12.

Nader Mohamed, et al., "Scalable Bulk Data Transfer In Wide Area Networks", The International Journal of High Performance Computing Applications. Fall 2003, pp. 237-248, vol. 17, No. 3, 2003 Sage Publications.

* cited by examiner

MULTIPLE CONCURRENT DATA LINK MANAGEMENT

CROSS-REFERENCE TO RELATED APPLICATION

This application is based upon and claims priority from prior U.S. patent application Ser. No. 13/307,601, filed on Nov. 30, 2011, now U.S. Pat. No. 8,885,584, the entire disclosure of which being herein incorporated by reference.

FIELD OF THE DISCLOSURE

The present disclosure generally relates to wireless communications devices and more particularly to communications devices that communicate over multiple data links.

BACKGROUND

Modern electronic devices, particularly end user data terminals such as smart phones, portable computers, personal digital assistants, tablet computers, and the like, are increasingly used to perform functions that require the transfer of data either to or from the device. The data transfers to these devices, from these devices, or to and from these devices sometimes have associated data communications performance requirements. For example, streaming data presentations such as audio presentations, video presentations, or combinations of audio and video presentations, are able to have minimum data transfer speed and maximum data packet transfer latency requirements in order to properly present the streaming data content to the user.

Electronic communications devices are also sometimes able to simultaneously transfer data over multiple data communications networks. In normal operation, these devices often transfer data using one data communications network that is selected based upon user input or that is selected automatically based upon specified user preferences. For example, a device may be able to transfer data over a Wireless Local Access Network (WLAN) interface, such as is defined by international standards including IEEE 802.11 defining, for example, the Wi-Fi® standard, or by cellular data communications networks such as 3rd Generation (3G) or 4th Generation (4G) cellular data communications networks. User preferences may specify that WLAN interfaces are preferred over cellular data communications networks. The reason for this user preference may be the relative costs of these two links. However, reasoning such as cost consideration is usually not explicitly specified or further analyzed in an automated decision process. Given this preference, the device generally will use the WLAN link regardless of that link's performance or reliability.

Therefore, the ability of electronic devices to satisfy data transfer requirements is affected by inefficiently utilizing available data communications links.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
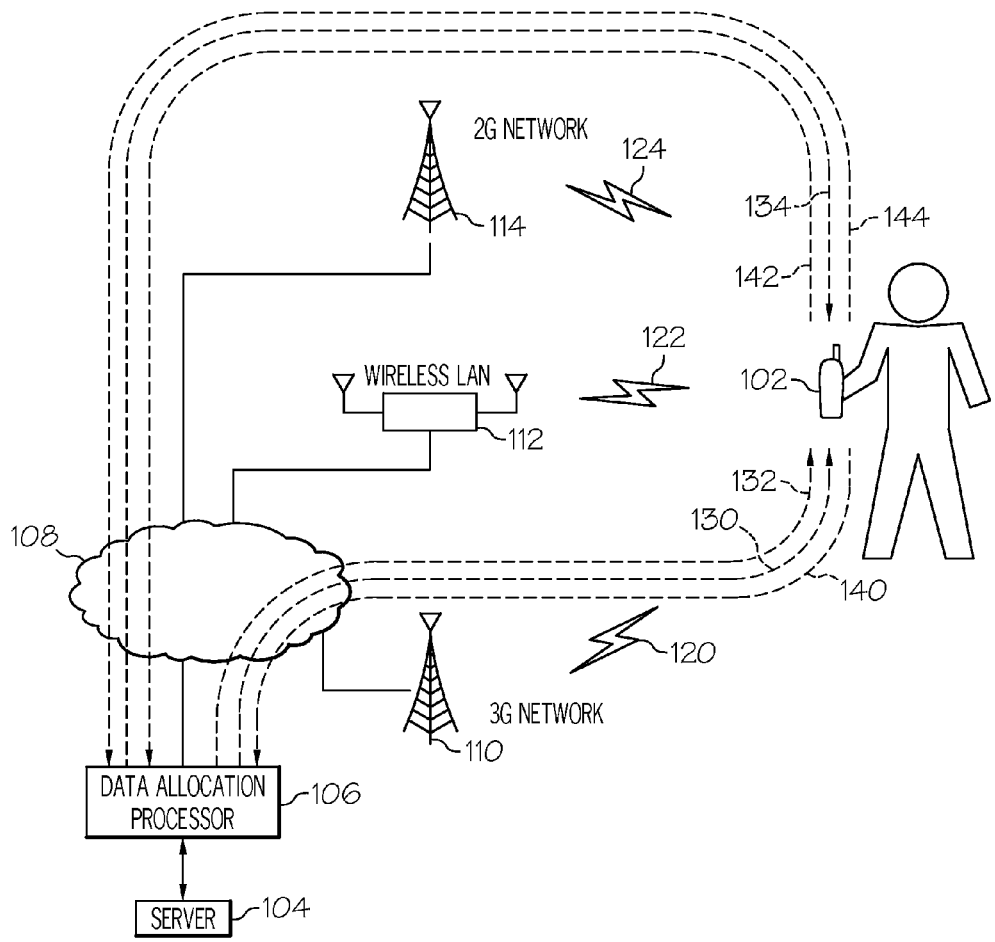
FIG. 1 depicts a multiple data link wireless communications scenario according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having," as used herein, are defined as comprising (i.e., open language). The term "coupled," as used herein, is defined as "connected," although not necessarily directly, and not necessarily mechanically. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

Described below are systems and methods that are applied to transferring data over multiple data links where these multiple data links include data communications networks that use different data communications protocols. A receiving device that is in communications with a transmitter via multiple available data links monitors the performance characteristics of each available data link. Receivers for each available data link include capabilities to measure, for example, current data reception rates, current data transmission latencies, and other relevant performance characteristics of each data communications link. Using this data, the receiver determines an allocation of data across the available data links such that transmission performance requirements for the particular data set are satisfied. In one example, a streaming data set may have a minimum data transmission throughput rate for a steady state streaming mode and a data transmission latency requirement specified as a maximum time delay between data packet reception.

The data allocation determined by the below described system and methods are based upon costs for using each data link. In various examples, different cost parameters are able to be assessed for using a particular data link. Monetary costs of transferring data over a particular data link is one cost that can be evaluated and used to determine a selected data allocation between or among the available data links. Other costs, such as power consumption by various radios in the receiver, are able to be assigned to the different data links and those costs are able to be incorporated into a determination of a data allocation. Once the allocation of data is determined at the receiver, the receiver sends an indication of the allocation of data to the transmitter of the data. The transmitter then allocates the data between or among the various data links according to the indication sent by the receiver.

In one example, the receiving device continually monitors the continued availability of existing data links and the availability of any new data links that are able to be used to communicate with a data transmitter. The receivers in the receiving device further continue to monitor the performance characteristics of available data links. As the performance characteristics of the available data links change, as a new data link becomes available, or as an available data link is lost, a reallocation based upon costs values and also based on the determined performance characteristics of the currently available links is determined. If the reallocation improves (i.e. decreases) the cost of transferring the data set, the reallocation is communicated to the transmitter and used for data transmission to the receiver.

FIG. 1 depicts a multiple data link wireless communications scenario 100 according to one example. The wireless communications scenario 100 depicts a wireless communications device 102 that is in a physical location that supports wireless data communications over multiple data communications networks. In this illustrated example, the wireless communications device 102 is shown to be in wireless communications via three data links. Two of the data links include wide area wireless data network base stations: a 3rd Generation (3G) network base station 110 and a 2nd Generation (2G) network base station 114. The third data link includes a Wireless Local Area Network (WLAN) base station, or Access Point, 112. In one example, the wireless communications device 102 is a portable device that supports concurrent data communications sessions over two or more wireless data networks, as is described below.

The 3G base station 110 is able to support wireless communications with the wireless communications device 102 through a 3G wireless data communications link 120. The 3G base station 110 is able to support wireless communications with the wireless communications device 102 using, for example, a 3G Universal Mobile Telecommunications System (UMTS) network protocol. The 2G base station 114 is able to support wireless data communications with the wireless communications device 102 through a 2G wireless communications link 124. The 2G base station 114 is able to support wireless communications with the wireless communications device 102 using, for example, a 2G Global System for Mobile communications (GSM) network protocol. In general, the 3G base station 110 and the 2G base station 114 are each part of a respective network of base stations that provide wireless data and voice communications services over a broad geographic area using their different respective protocols.

The WLAN base station 112 is able to communicate data with the wireless communications device 102 through the WLAN wireless data communications link 122 by using any suitable short range wireless protocol. Examples of protocols able to be used by the WLAN base station 112 include Wi-Fi® protocols defined by the IEEE 802.11 series of standards, Bluetooth® data communications protocols, and the like.

The multiple data link wireless communications scenario 100 shows a server 104 that stores data to be transferred to a wireless communications device 102. In general, the server 104 is able to store, for example, streaming data files such as streaming video, streaming audio, and the like. Streaming data files store data that is sent to a consuming device, such as the wireless communication device 102, and the consuming device uses or presents the received data as it is received. In an example of streaming video, streaming video data is transferred to the wireless communications device 102. The wireless communications device 102 receives and accumulates an initial portion of the transferred streaming video data until a determined amount of data is accumulated into a buffer. The determined amount is defined by a threshold amount of data that is stored in the buffer and has not been consumed by the receiving device. The threshold amount is not generally directly related to the total size of the streaming video data file that is to be transferred. After the determined amount of unconsumed data is accumulated in the buffer, the wireless communications device 102 begins to process the received data and present the video images to the user. Presenting the video images of the received streaming video data is generally performed concurrently with receiving additional streaming video data.

The multiple data link wireless communications scenario 100 illustrates a number of data communication flows. The operation of one example allows a data file, such as a streaming data file, to be allocated between or among multiple data links for transmission to a receiver, such as the wireless communications device 102. The multiple data link wireless communications scenario 100 includes a data allocation processor 106 that receives streaming data from the server 104 that is to be sent to a receiving device, such as the wireless communications device 102. The data allocation processor 106 bases the allocation of data across multiple data links based upon information received from the wireless communications device 102. The data allocation processor 106 communicates with a wide area network 108, such as the Internet or other public or private wide area communications networks, to perform data communications with one or more wireless communications devices 102 through, for example, the 3G network base station 110, the 2G network base station 114, and the WLAN base station 112. In further examples, the wide area network 108 is able to include wired data communications systems such as wired Internet connections, circuit switched communications networks, packet switched communications networks, or combinations of these types of wired networks.

The multiple data link wireless communications scenario 100 shows a 3G data link 130 that depicts one data transmission path between the data allocation processor 106 and the wireless communications device 102. Data transferred via the 3G data link 130 to the wireless communications device 102 is conveyed through the wide area network 108 to the 3G network base station 110 and is further transferred over the 3G wireless data communications link 120 to the wireless communications device 102. The wireless communications device 102 is able to send data back to the data allocation processor 106, or to the server 104, using the 3G wireless data communications link 120 through a 3G return data link 140. The 3G return data link 140 conveys data through the 3G wireless data communications link 120 to the 3G network base station 110 and the data is then communicated through the wide area network 108 to the data allocation processor 106 and, if required, to the server 104.

The multiple data link wireless communications scenario 100 also shows a 2G data link 134 that depicts another data transmission path between the data allocation processor 106 and the wireless communications device 102. Data transferred via the 2G data link 134 is conveyed through the wide area network 108 to the 2G network base station 114 and is further transferred over the 2G wireless data communications link 124 to the wireless communications device 102. The wireless communications device 102 is able to send data back to the data allocation processor 106, or to the server 104, using the 2G wireless data communications link 124 through a 2G return data link 144. The 2G return data link 144 conveys data through the 2G wireless data communications link 124 to the 2G network base station 114 and the data is then communicated through the wide area network 108 to the data allocation processor 106 and, if required, to the server 104.

The multiple data link wireless communications scenario 100 further shows a wireless LAN data link 132 that depicts one data transmission path between the data allocation processor 106 and the wireless communications device 102. As depicted, data transferred via the wireless LAN data link 132 is conveyed through the wide area network 108 to the wireless LAN base station 112 and is transferred over the wireless LAN data communications link 122 to the wireless communications device 102. The wireless communications device 102 is able to send data back to the data allocation processor 106, or to the server 104, using the wireless LAN data communications link 122 through a wireless LAN return data link 142. The wireless LAN return data link 142 conveys data through the wireless LAN wireless data communications link 122 to the wireless LAN base station 112 and the data is then communicated through the wide area network 108 to the data allocation processor 106 and, if required, to the server 104.

Although the above description depicts wireless data links, further communications scenarios are able to include data links between the data allocation processor 106 and a remote device that includes wired data links to the remote device. Examples of such scenarios include a remote device that is connected to the wide area network 108 by a low speed or unreliable wired data link. In such an example, the lower performance wired data link is able to be augmented by wireless or higher cost wired data links through the systems and methods described below.

Figure 2:
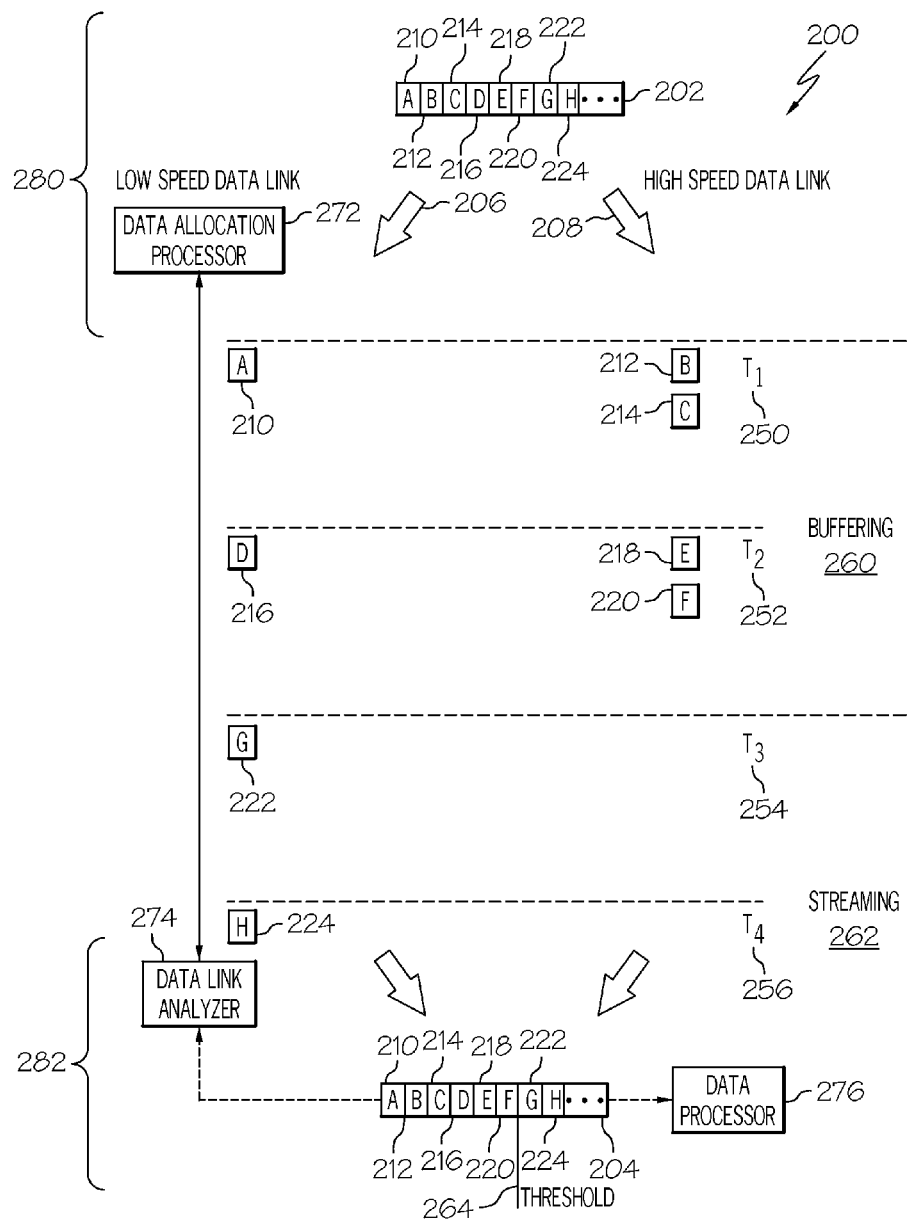
FIG. 2 illustrates a data transfer from a data sender to a data receiver, in accordance with one example.

FIG. 2 illustrates a data transfer 200 from a data sender 280 to a data receiver 282, in accordance with one example. The data transfer 200 shows a data sender 280 that includes a transmit data buffer 202 that contains, for example, a streaming data set that is to be transferred over multiple data links that are each implemented over respective data communications networks. The data set contained in the transmit buffer 202 is divided into a number of data packets for transmission over the multiple data links. In one example, the data sender 280 includes a data allocation processor 272 that allocates data within the transmit data buffer 202 between or among two or more data links for transfer to the data receiver 282. As described below, the data allocation processor 272 receives information from a data link analyzer 274 within the data receiver 282 to support the allocation of data over the multiple data links.

The data transfer 200 depicts the transfer of a data set in the transmit buffer 202 to the data receiver 282 by allocating that data for transmission across two data links for transmission from the data sender 280. The two data links shown for this example are a low speed data link 206 and a high speed data link 208. The allocation of data between or among data links is based, in this example, partially on the cost of transferring data over the respective data links. In this example, the cost of transferring data over the low speed data link 206 is assumed to be lower that the cost of transferring data over the high speed data link 208. The costs associated with transferring data over a particular data link are not limited to monetary costs but are also able to include, for example, energy consumption associated with using the respective data link in a battery powered device. Any other "costs" associated with the use of a particular data link are also able to be incorporated into the data allocation determination of various examples. Monetary costs, for example, are defined by the operators of the data links. Power consumption is set by the design of the hardware implementing the particular data link. Costs of transferring data over a particular data link are quantities that are generally defined outside of the data allocation processing described below and provided as part of, for example, device configuration data. Based upon the difference in cost for using the two data links, the low speed data link 206 is preferred over the high speed data link 208 and algorithms that allocate the data packets between these two links will maximize the use of the low speed data link 206 while satisfying the data transfer performance requirements for a particular data transfer.

The data transfer 200 illustrates a transfer of data from the transmit buffer 202 in the data sender 280 to a receive buffer 204 in the data receiver 282. The data receiver 282 is generally remote from the data sender 280. In the above described multiple data link wireless communications scenario 100, the data sender 280, and its transmit buffer 202, is associated with the data allocation processor 106. The data receiver 282, and its receive buffer 204, is associated with the wireless communications device 102. In order to simplify the discussion of this example, the following description describes the transfer of the data set in the transmit buffer 202 to the receive buffer 204 by using two data links. The principals of this illustration and discussion are able to be extended to transferring data over more than two data links. In one example, these two or more data links are implemented using different data communications networks that use different data communications protocols.

The data transfer 200 illustrates a transmit data buffer 202 that depicts a set of eight consecutive data packets at the beginning of the transmit data buffer 202. These eight data packets are shown in the beginning of the transmit data buffer 202 and depicted as a data packet A 210, a data packet B 212, a data packet C 214, a data packet D 216, a data packet E 218, a data packet F 220, a data packet G 222, and a data packet H 224. The size of the transmit buffer 202 is arbitrary and is able to contain a data set of any size that is to be transferred to a receiving device, such as the wireless communications device 102 described above. For example, further data packets are able to be stored in the transmit buffer as indicated by ellipses to the right of data packet H 224. Additionally, the data set to be transferred is able to grow dynamically, such as with a live streaming video data feed.

In order to simplify the following discussion and facilitate an understanding of the concepts of the described processing, these two data links are described as transferring data packets that each contains equal amounts of data. It is clear that the different data links used to communicate a data set are each able to accept, use, or accept and use data packets containing different amounts of data. Further, a particular data link is also able to accept data packets of varying sizes. A particular data link is also able to be configured before, during or before and during, a single data set transmission to change the size of data packets used to transfer data.

The data transfer 200 depicts four time intervals during which data packets are transferred from the transmit buffer 202 to the receive buffer 204. These four time intervals are shown as consecutive time intervals of equal duration and are depicted as a first time interval $T_1$ 250, a second time interval $T_2$ 252, a third time interval $T_3$ 254, and a fourth time interval $T_4$ 256. These four time intervals further illustrate two phases of the data transfer 200. The first phase of the data transfer 200 is a buffering phase 260 that consists of the first time interval $T_1$ 250 and the second time interval $T_2$ 252. The second phase of the data transfer is a streaming phase 262 that consists of the third time interval $T_3$ 254 and the fourth time interval $T_4$ 256.

These two data transfer phases generally correspond to two modes of data transfer when communicating streaming data, such as streaming audio data or video data. When a streaming data transfer begins, the data transfer is generally in the buffering phase 260 wherein a portion of the streaming data is received and accumulated into a buffer by the receiving device. Receiving and accumulating data into a buffer is referred to herein as "buffering." The data accumulated in this buffer is later read out during time intervals when data transfers are slower than the streaming rate of the data or when the data transfer stops due to various communications factors.

After a sufficient amount of data is contained in a receive buffer, the data transfer changes to the streaming phase 262 where the data transfer rate can be adjusted to supply only the amount of data being consumed by the streaming data presentation, such as a presentation of streaming audio, video, or audio and video. In general, a particular data transfer is able to alternate between these two phases where the transfer re-enters the buffering phase when data is partially depleted from the buffer during times of slow or no data communications. The illustrated division of time intervals between buffering phases and streaming phases is only one example, and the state of a data link generally changes between these two phases at different intervals.

In the buffering phase 260 of this example, the data transfer 200 has a requirement for a maximum data transfer rate using the available data links. In further examples, the buffering phase is able to specify any data communications requirement, such as minimum data communications speeds, maximum latency, or combinations of performance requirements. Some data sets specify required quality of service parameters that define data communications requirements to properly receive and consume the data set. Once a defined amount of data has been accumulated into the buffer, the data transfer 200 enters a streaming phase 262. In the streaming phase, the data transfer 200 specifies data communications requirements based on the requirements for the particular streaming data set being transferred. In one example, during the buffering phase 260 the transfer is able to specify high data transfer speeds but fairly low performance (i.e., long) latency requirements. During the streaming phase 262, the transfer is able to specify lower data transfer throughput rates but more stringent (i.e., short) data latency requirements in order to maintain a proper streaming data presentation at the receiver. In the example described below, the low speed data link 206 is able to satisfy the data transfer speed and other performance requirements while in the streaming phase.

In the following discussion, the low speed data link 206 is shown to be able to transfer one packet in the time that the high speed data link 208 is able to transfer two packets. This relationship is chosen to simplify the description of the processing used to efficiently utilize these two data links to accomplish a data set transfer. The relative costs of transferring data over each of these two data links is also described below as being inversely related to the speed of the two data links. These relationships are chosen as one example for illustration purposes and are not a generalized description of a relationship between or among multiple data links used to communicate data. The methods and systems described below are able to utilize multiple data links that have any relationship between their various performance parameters, cost parameters, or performance and cost parameters.

The data transfer 200 depicts four time intervals during which data packets are transferred from the transmit buffer 202 to the receive buffer 204. During a first time interval $T_1$ 250, data packet A 210 is transferred over the low speed data link 206 while data packet B 212 and data packet C 214 are transferred over the high speed data link 208. During a second time interval $T_2$ 252, data packet D 216 is transferred over the low speed data link 206 while data packet E 218 and data packet F 220 are transferred over the high speed data link 208. As described above, the first time interval $T_1$ 250 and the second time interval $T_2$ 252 occur during a buffering phase 260 of the data transfer 200.

During a streaming phase 262 of the data transfer 200, data packet G 222 is transferred over the low speed data link 206 during the third time interval $T_3$ 254 and data packet H 224 is also transferred over the low speed data link 206 during the fourth time interval $T_4$ 256. Because in this example the low speed data link 206 is able to satisfy the communications performance for the data set during the streaming phase 262 of the data transfer 200, no data is transferred over the high speed data link 208 during the streaming phase 262. In another example, the low speed data link 206 exhibits communications performance below the required levels specified for the data set characteristics for the streaming phase, and some data packets in such examples are also transferred over the high speed data link 208 to satisfy the overall communications performance requirement for the streaming phase 262 of the data transfer 200.

Received packets are stored in the receive buffer 204 in their proper order. The order of received data packets is able to be determined by, for example, information encapsulated with the data packets for transmission by a data communications protocol. The data packets transferred during the buffering phase 260, namely data packet A 210, data packet B 212, data packet C 214, data packet D 216, data packet E 218, and data packet F 220, are shown to fill the receive buffer below a threshold 264. The threshold 264 depicts a buffering threshold that represents an amount of data that is to be accumulated in the receive buffer during the buffering phase 260 in order to properly support streaming data playback. Once the amount of received and buffered data reaches the threshold 264, the data transfer is able to transition to the streaming phase 262.

The location of threshold 264 is shown as an example. In operation, the receive buffer 204 used as a streaming media receive buffer operates in a manner that allows newly received data to be added to the end of the buffer while data being consumed is extracted from the front of the buffer. Various buffer structures, such as a "ring buffer" structure, cause a movement during the course of a data transfer of the location in the buffer at which unused data is stored. In such structures, the "threshold" value relates to the amount of unused data stored in the buffer and is not a fixed location in the buffer. Once data packets are accumulated into the receive buffer 204, these multiple data packets are transferred to a data processor 276. The data processor 276 receives the multiple data packets that are accumulated in the receive buffer 204 and processes those data packets to produce an output data stream. This output data stream is then output in a suitable manner, such as through an audio or audio/video display, as a data output delivered through a wired or wireless interface to another device, or in any other output format.

In one example, a data link analyzer 274 located within the data receiver 282 monitors the amount of data contained in the received buffer 204 and also monitors performance metrics of the individual data links available at the receiver. The data link analyzer 274 determines, based upon observed data link operating characteristics, current performance metrics for each data link available between the data sender 280 and the data receiver 282. The data link analyzer 274 further determines variations in data communications requirements based upon, for example, if the available contents within the receive buffer 204 are above or below the threshold 264. The data link analyzer 274 of one example determines, based upon the determined current performance metrics for each data link, an allocation of data across multiple communications links for transmission from the transmit buffer 202 to the receive buffer 204. Data allocation data 270 that includes an indication of this determined allocation of data in one example is communicated to the data allocation processor 272 of the data sender 280. In one example, the data allocation data 270 specifies a ratio of the amount of data to transfer over each data link. In a particular example, the observed data communications performance of the low speed data link 206 and the high speed data link 208 could result in a data allocation data specification that 40% of the data is to be transferred over the high speed data link 208 while 60% of the data is to be transferred over the low speed data link 206.

In further examples, the data link analyzer 274 only determines data link performance metrics and an indication of data communications requirements. Examples of an indication of data communications requirements include a communications phase such as the buffering phase 260 or the streaming phase 262. The data link analyzer 274 of this example then transmits data allocation data 270 that includes the determined data link performance metrics and the indication of data communications requirements.

Figure 3:
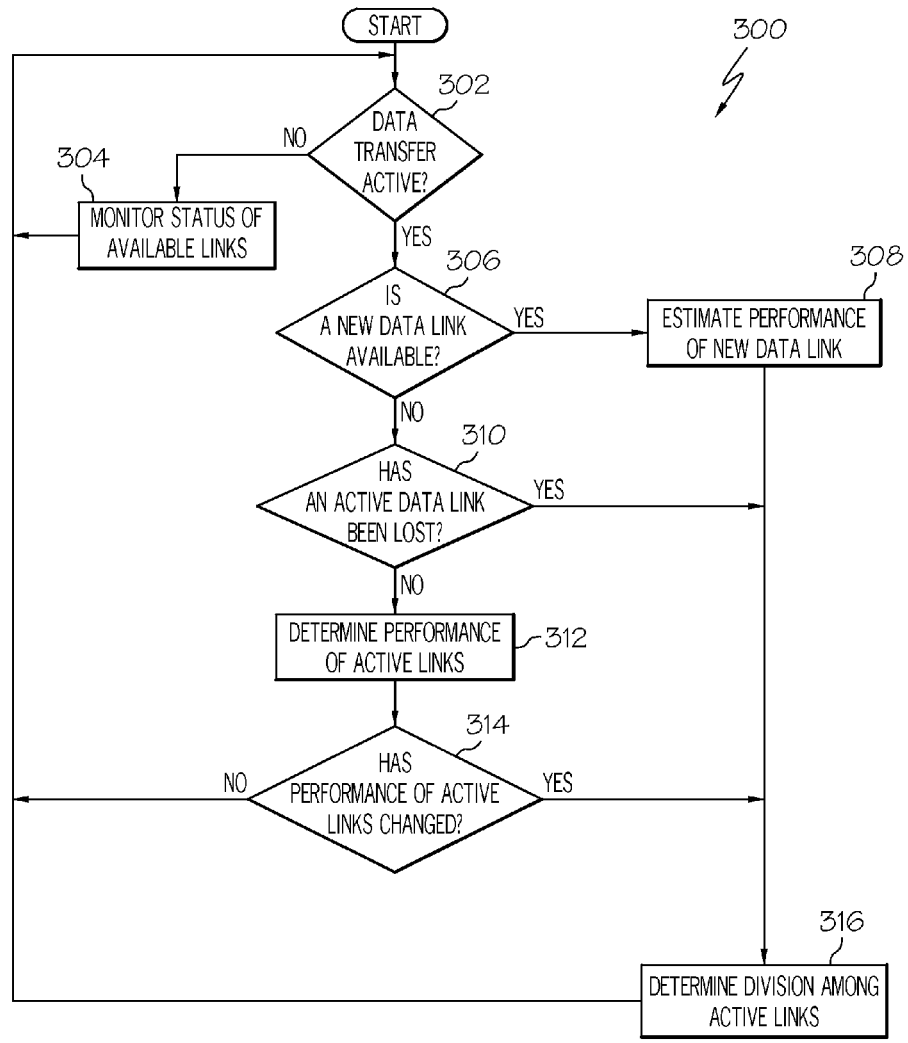
FIG. 3 illustrates a data link monitoring process, in accordance with one example.

FIG. 3 illustrates a data link monitoring process 300, in accordance with one example. The data link monitoring process 300 in one example is a background process performed by a data receiving device to determine which data links are currently available, and also to determine the performance characteristics of each available data link.

The data link monitoring process 300 begins by determining, if a data transfer is currently active. In one example, data links currently being used to transfer data are analyzed to determine the data transfer characteristics of those links. Determining the actual, currently realized performance characteristics of an active data link allows a more accurate and efficient determination of how to allocate data across two or more data links.

If a data transfer is not active, the data link monitoring process 300 monitors, at 304, the status of available data links. Data links may report signal degradation, changes in modulation formats that alter the maximum capacity of the data link at a particular time, or other information that can be used to evaluate the expected performance of the particular data link in a data transfer.

If a data transfer is active, the data link monitoring process 300 continues by detecting, at 306, if a new data link is available. A new data link can be come available, for example, if a receiving device enters a geographic coverage area for the wireless data link. If a new data link is detected to be available, the data link monitoring process 300 continues to estimate, at 308, the performance of the new data link.

If a new data link was not detected to have become available, the data link monitoring process 300 continues to detect, at 310, if an active data link has been lost. An active data link becomes lost, for example, if a receiving device leaves a geographic coverage area for a wireless data link. If it is determined that an active data link has not been lost, the data link monitoring process 300 continues by determining, at 312, the performance of the active data links. Determining performance of active data links is performed by any technique available for the particular data link, such as by monitoring characteristics of data transfer operations.

The data link monitoring process 300 continues to detect, at 314, if the performance of any of the active data links has changed. This change is detected, for example, by comparing the performance characteristics determined at 312 with performance characteristics that were previously determined for those links and stored in a data storage. If a change in the performance of the active links has not been detected, the data link monitoring process 300 returns to determining, at 302, if a data transfer is active.

After the data link monitoring process 300 estimates, at 308, the performance characteristics of a new data link, after detecting, at 310, that an active data link has not been lost, or after detecting, at 314, that the performance characteristic of an active data link has changed, the data link monitoring process 300 determines, at 316, an allocation of data among the active data links. In one example, such as in response to a change in performance, the loss or acquisition of a data link, this allocation of data is a reallocation of data to be transmitted over the available data links. This reallocation is determined so as to satisfy the data transfer performance requirements for a current data transfer while satisfying a cost function, such as minimizing costs. The data link monitoring process 300 then returns to determining, at 302, if a data transfer is active.

Figure 4:
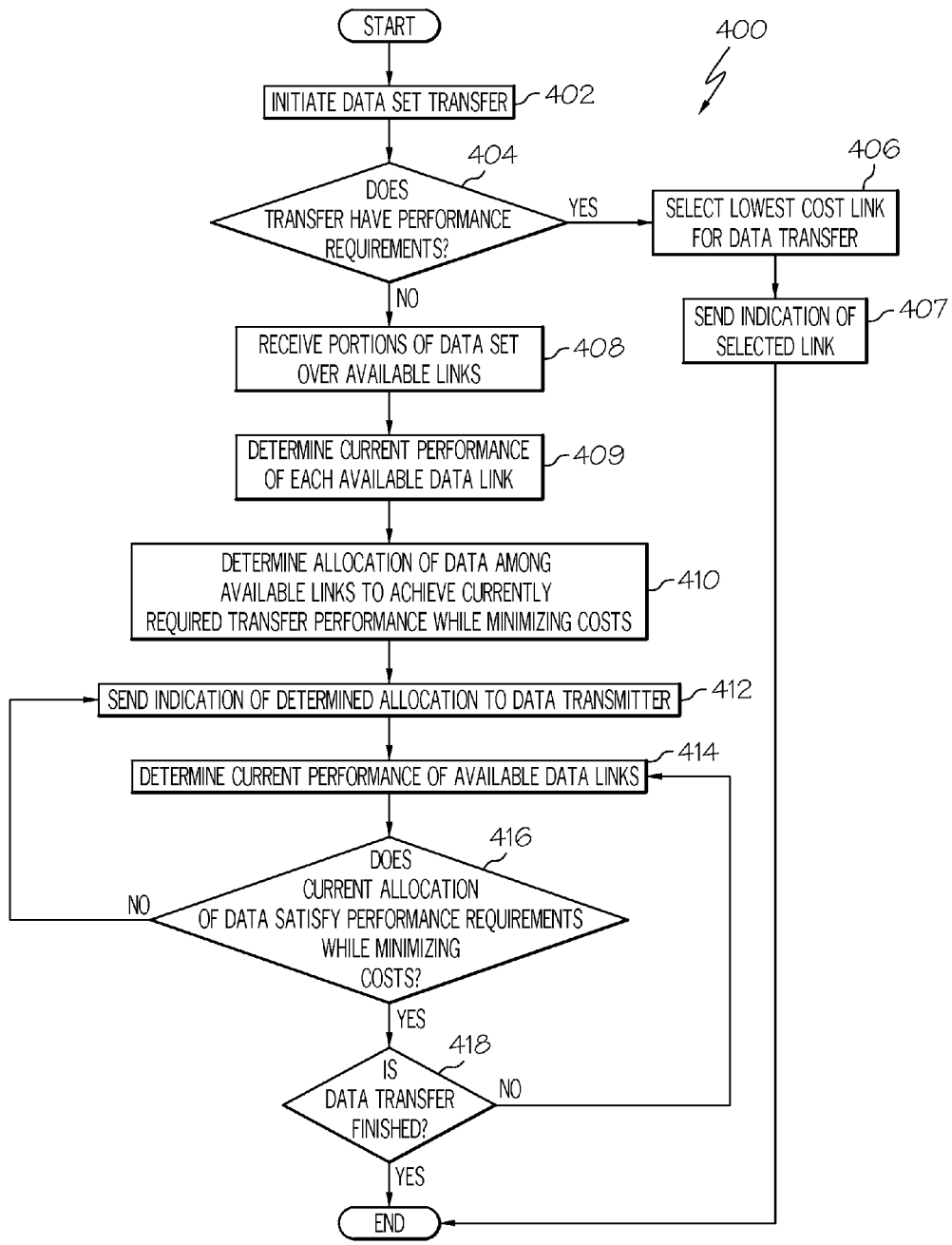
FIG. 4 is a determine data allocation process, in accordance with one example.

FIG. 4 is a determine data allocation process 400, in accordance with one example. The determine data allocation process 400 is an example of a process performed by a wireless communications device 102 to determine an allocation of data across multiple data links in order to achieve desired data transfer performance and cost specifications and goals. The following discussion is based upon an example of a portable electronic device operated by a person to receive and use data. Examples of data transferred to the portable electronic device include streaming audio presentation, streaming video presentations, graphical presentations, and the like. The determine data allocation process 400 is able to be similarly used by any electronic device that is able to multiplex the communication of data over multiple data links. In this example, data communications links are selected based in part on the cost of using the link. In various examples, different cost functions and criteria are able to be used. One example of a cost is a monetary cost of transferring data over a particular link. Another example of a cost that can be minimized by selecting different combinations of data links include power consumed by the communications equipment for each link, particularly in battery powered applications.

The determine data allocation process 400 begins by initiating, at 402, a data set transfer. The data set transfer is able to originate in response to actions at either the device performing the determine data allocation process 400 or is able to originate at a remote device, such as the device sending the data.

The determine data allocation process 400 continues by determining, at 404, if the data set transfer has performance requirements. Examples of data set transfers that have performance requirements include streaming data conveying audio, video, or combinations of audio and video. Examples of data set transfers that do not have performance requirements include bulk data transfers such as downloading of user applications, and the like. Examples of performance requirements that can be specified for a data transfer include a minimum data communications speed, such as a minimum number of average bits per second transferred over the link, and maximum latency, such as a maximum number of milliseconds for a data packet to travel from its origination to its destination over the link.

If it is determined that the transfer does not have performance requirements, the lowest cost data link is selected for the data transfer, at 406. The device performing the determine data allocation process 400 communicates, at 407, an indication to the transmitter that the selected data link is to be used to transfer the data.

If it is determined that the transfer does have performance requirements, the determine data allocation process 400 continues by receiving, at 408, portions of the data set being transferred over one or more of the available data links. In various examples, data is able to be sent over a default set of data links, or devices may be configured to initially send data over all available data links.

The determine data allocation process 400 continues by determining, at 409, the current performance of each available data link. Performance quantities that are measured include, for example, an average speed of data transfer and statistics concerning the latency of data transmission. In one example, the current performance of a data link that is currently transferring data is determined by monitoring the performance of the operating data link. Current performance for a data link that is not currently transferring data but that is available for data transmission is able to be estimated based on specifications for the design or operation of the data link. A data link is available on an electronic device if it has a connection with a remote communications node with which the electronic device is to exchange data.

The determine data allocation process 400 continues by determining, at 410, an allocation of data among available data links to achieve the currently required transfer performance while minimizing costs. In various examples, an allocation of data among the available data links is determined so as to minimize costs as specified for the available data links while satisfying data transfer performance requirements. The allocation of data is determined in one example at a receiver of the data. The data receiver is generally a device that is operating with the available data links and is a central location that has ready access to the availability, performance characteristics, and other data communications characteristics for the potentially disparate data links available to the receiver. In general, the current data link performance characteristics and availability for all available data links are better able to be determined at a receiver than at other nodes of data communications networks. In one example, a specification of a percentage of the data to be transferred is determined for the allocation of data. In one example, an allocation of data may be determined that specifies that 60% of data is to be transferred over one available data like and 40% of data is to be transferred over another available data link.

The determine data allocation process 400 continues by sending, at 412, an indication of the determined allocation to the data transmitter. The indication of the determined allocation of data is able to convey, for example, percentages of that total data transfer that are to be transferred from the sender over different data links. The indication is able to be sent from a data receiver to a data receiver over, for example, a reverse channel of one of the available data links. This indication is generally able to be communicated by any data transmission path available between the data receiver and the data sender.

The determine data allocation process 400 then continues by determining, at 414, the current performance of the data links. The performance of the data links is again determined at this point in order to incorporate changes in the performance of the particular data links into the determination of the allocation of the data to be transferred over the available data links. Changes in the performance of a particular data link may be an improvement, such as by obtaining a stronger signal, or a degradation, such as by suffering a reduction in signal strength. Determining the current performance of the data links is also able to determine that new data links have become available, such as by entering coverage of a WLAN system, or that previously existing data links are no longer available.

The determine data allocation process 400 next determines, at 416, if the current allocation of data satisfies data transfer performance requirements while minimizing costs. This determination may be affected by a change in performance of a data link currently being used to transfer data, by a loss of a data link currently being used to transfer data, by an increase in performance of a data link being used to transfer data, by a detection of a newly available data link, or any combination of these events.

If it is determined that the current allocation of data does not satisfy the data transfer performance requirements while minimizing costs, the determine data allocation process 400 returns to determine, at 410, an allocation of data among available links to achieve the currently required transfer performance while minimizing costs. If it is determined that the current allocation of data satisfies data transfer performance requirements while minimizing costs, the determine data allocation process 400 determines, at 418, if the data transfer is finished. If the data transfer is not finished, the determine data allocation process 400 returns to determine, at 414, the current performance of available data links. If the data transfer is finished, the determine data allocation process 400 ends.

Figure 5:
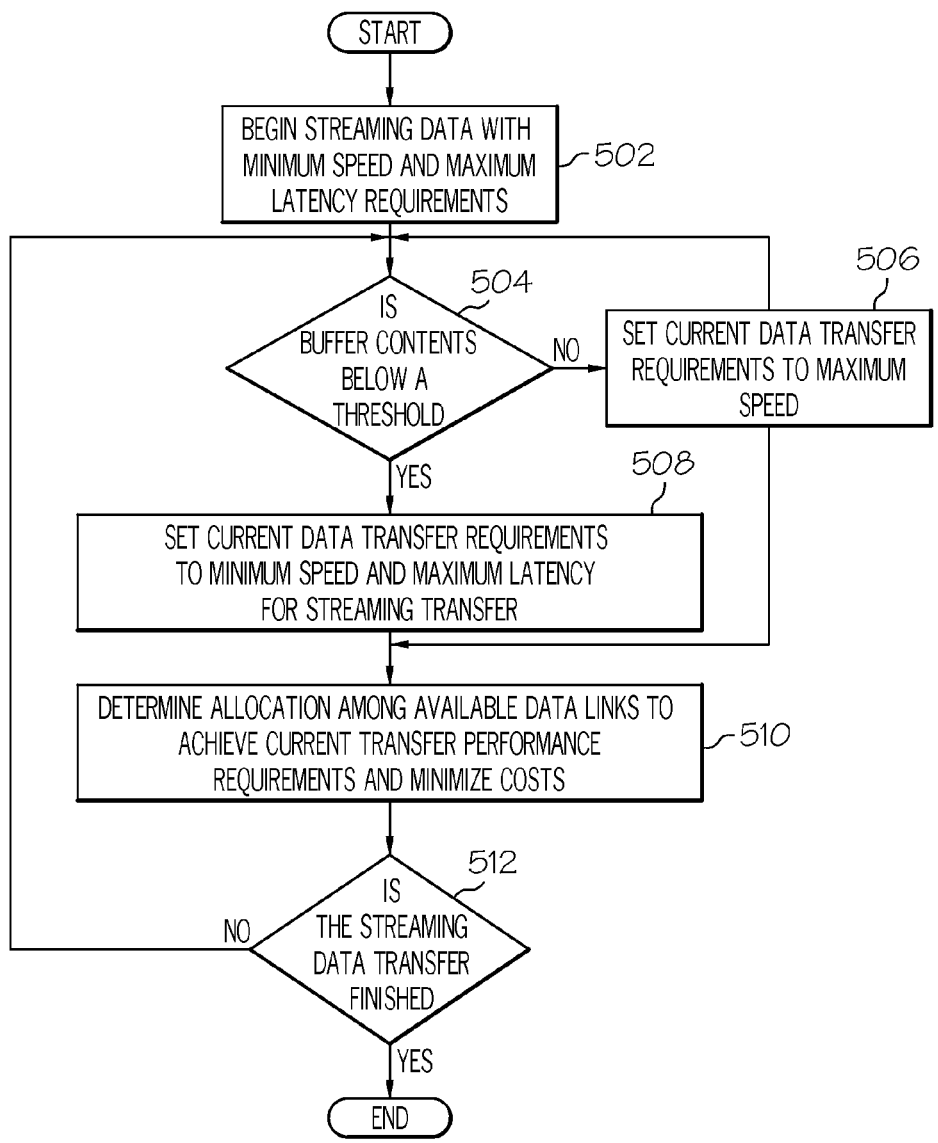
FIG. 5 is a streaming data performance requirement determination process, according to one example.

FIG. 5 is a streaming data performance requirement determination process 500, according to one example. The streaming data performance requirement determination process 500 is performed in the course of transferring streaming data to a device, where the receiving device includes a buffer to temporarily store data prior to being processed by a processing application and, for example, presented to a user.

The streaming data performance requirement determination process 500 starts by beginning, at 502, streaming data with minimum speed and maximum latency requirements. Streaming data in further examples are able to have any type or variation of specified minimum data transfer performance requirements.

The streaming data performance requirement determination process 500 continues by determining, at 504, if the buffer contents are below a threshold. The threshold for the buffer contents is able to be defined based upon a number of considerations, such as expected variation in data transfer performance requiring data from the buffer to be supplied to processing applications without immediate replenishment by the data links.

If it is determined that the buffer contents are below the threshold, the streaming data performance requirement determination process 500 of one example sets, at 506, the current transfer requirements to maximum speed. The maximum transmission speed is selected in order to most rapidly fill the buffer to a level above the threshold and minimize user waiting for the start of a streaming data presentation.

If it is determined that the buffer contents are not below the threshold, the streaming data performance requirement determination process 500 sets, at 508, the current data transfer requirements to a minimum speed and maximum latency that can be tolerated by the particular streaming data. In one example, streaming data includes metadata that specifies this minimum speed and maximum latency.

After setting the requirements to maximum speed, at 506, or to the minimum requirements for the streaming data, at 508, the streaming data performance requirement determination process 500 determines, at 510, an allocation among available data links to achieve the current transfer requirement and minimize costs. The streaming data performance requirement determination process 500 then continues to determine, at 512, if the streaming data transfer is finished. If the streaming data transfer is not finished, the streaming data performance requirement determination process 500 returns to determining, at 504, if the buffer contents are below the threshold. If the streaming data transfer is finished, the streaming data performance requirement determination process 500 ends.

Figure 6:
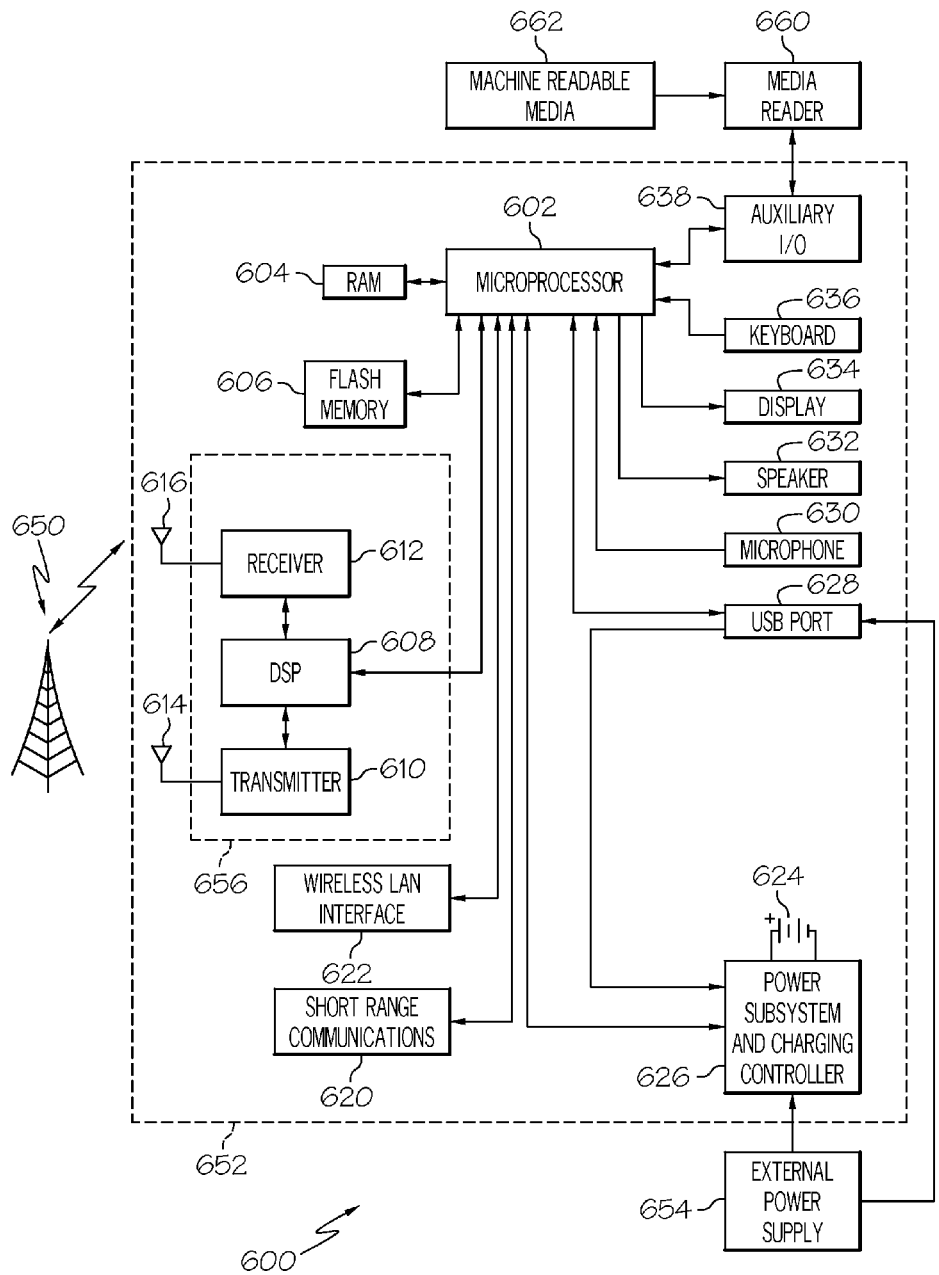
FIG. 6 is a block diagram of an electronic device and associated components in which the systems and methods disclosed herein may be implemented.

FIG. 6 is a block diagram of an electronic device and associated components 600 in which the systems and methods disclosed herein may be implemented. In this example, an electronic device 652 is a wireless two-way communication device with voice and data communication capabilities, such as the wireless communications device 102. Such electronic devices communicate with a wireless voice or data network 650 using a suitable wireless communications protocol. Wireless voice communications are performed using either an analog or digital wireless communication channel. Data communications allow the electronic device 652 to communicate with other computer systems via the Internet. Examples of electronic devices that are able to incorporate the above described systems and methods include, for example, a data messaging device, a two-way pager, a cellular telephone with data messaging capabilities, a wireless Internet appliance or a data communication device that may or may not include telephony capabilities.

The illustrated electronic device 652 is an example electronic device that includes two-way wireless communications functions. Such electronic devices incorporate a communication subsystem 656 that includes elements such as a wireless transmitter 610, a wireless receiver 612, a digital signal processor (DSP) 608, and associated components such as one or more antenna elements 614 and 616. The digital signal processor (DSP) 608 performs processing to extract data from received wireless signals and to generate signals to be transmitted. The particular design of the communication subsystem is dependent upon the communication network and associated wireless communications protocols with which the device is intended to operate.

A short-range communications subsystem 620 is a further component in one example that provides communication between the electronic device 652 and different systems or devices, which need not necessarily be similar devices. Examples of short-range communication subsystems 620 include an infrared device and associated circuits and components, or a Radio Frequency based communication subsystem such as a Bluetooth®, or a Zigbee®, communication subsystem to provide for communication with similarly-enabled systems and devices.

A WLAN interface 622 performs communications with a WLAN access point (not shown) to implement a generally local wireless data communications. An example of a WLAN interface 622 includes a radio interface for a Wi-Fi® network. The electronic device is able to optionally use the WLAN interface 622, either alone or in combination with other wireless data circuits such as the short range communications subsystem 620, the wireless transmitter 610 and the wireless receiver 612 in conjunction with a DSP 608, or any combination of these elements, to perform data communications. In particular, substantially simultaneous use of multiple data links to perform a transfer of one data set, as is detailed above, is able to be performed using any combination of these wireless communications resources.

The electronic device 652 includes a microprocessor 602 that controls the overall operation of the electronic device 652. The microprocessor 602 interacts with the above described communications subsystem elements and also interacts with other device subsystems such as flash memory 606, random access memory (RAM) 604, auxiliary input/output (I/O) device 638, Universal Serial Bus (USB) Port 628, display 634, keyboard 636, speaker 632, microphone 630, a short-range communications subsystem 620, a WLAN interface 622, a power subsystem and charging controller 626, and any other device subsystems. In one example, the microprocessor 602 monitors data link performance characteristics and determines an allocation of data for transmission over two or more data links to the electronic device 652, as is described above.

A power pack 624 is connected to a power subsystem and charging controller 626. The power pack 624 provides power to the circuits of the electronic device 652. The power subsystem and charging controller 626 is also able to receive power from an external power supply 654 that is sometimes connected through a power connector of the electronic device 652 or through the USB port 628. The power subsystem and charging controller 626 includes power distribution circuitry for providing power to the electronic device 652 and also contains power pack charging controller circuitry to manage recharging the power pack 624 when power is available from, for example, an external power supply 654.

The USB port 628 provides data communication between the electronic device 652 and one or more external devices. Data communication through USB port 628 enables a user to set preferences through the external device or through a software application and extends the capabilities of the device by enabling information or software exchange through direct connections between the electronic device 652 and external data sources rather than through a wireless data communication network.

Operating system software used by the microprocessor 602 is stored in flash memory 606. Further examples are able to use a power pack backed-up RAM or other non-volatile storage data elements to store operating systems, other executable programs, or both. The operating system software, device application software, or parts thereof, are able to be temporarily loaded into volatile data storage such as RAM 604. Data received via wireless communication signals or through wired communications are also able to be stored to RAM 604.

The microprocessor 602, in addition to its operating system functions, is able to execute software applications on the electronic device 652. A predetermined set of applications that control basic device operations, including at least data and voice communication applications, is able to be installed on the electronic device 652 during manufacture. Examples of applications that are able to be loaded onto the device may be a personal information manager (PIM) application having the ability to organize and manage data items relating to the device user, such as, but not limited to, e-mail, calendar events, voice mails, appointments, and task items.

Further applications may also be loaded onto the electronic device 652 through, for example, the wireless network 650, an auxiliary I/O device 638, USB port 628, short-range communications subsystem 620, WLAN interface 622, or any combination of these interfaces. Such applications are then able to be installed by a user in the RAM 604 or a non-volatile store for execution by the microprocessor 602.

In a data communication mode, data contained in a received signal is provided the microprocessor 602 after being processed by one or more of the wireless receiver 612 and wireless transmitter 610, the WLAN interface 622, the short range communications subsystem 620, or combinations of these circuits. The microprocessor 602 is able to further process the received data for output to the display 634, or alternatively, to an auxiliary I/O device 638 or the USB port 628. A user of the electronic device 652 may also compose data items, such as e-mail messages, using the keyboard 636, which is able to include a complete alphanumeric keyboard or a telephone-type keypad, in conjunction with the display 634 and possibly an auxiliary I/O device 638. Such composed items are then able to be transferred over a communication network through the communication subsystem.

For voice communications, overall operation of the electronic device 652 is substantially similar, except that received signals are generally provided to a speaker 632 and signals for transmission are generally produced by a microphone 630. Alternative voice or audio I/O subsystems, such as a voice message recording subsystem, may also be implemented on the electronic device 652. Although voice or audio signal output is generally accomplished primarily through the speaker 632, the display 634 may also be used to provide an indication of the identity of a calling party, the duration of a voice call, or other voice call related information, for example.

Depending on conditions or statuses of the electronic device 652, one or more particular functions associated with a subsystem circuit may be disabled, or an entire subsystem circuit may be disabled. For example, if the power pack temperature is high, then voice functions may be disabled, but data communications, such as e-mail, may still be enabled over the communication subsystem.

A media reader 660 is able to be connected to an auxiliary I/O device 638 to allow, for example, loading computer readable program code of a computer program product into the electronic device 652 for storage into flash memory 606. One example of a media reader 660 is an optical drive such as a CD/DVD drive, which may be used to store data to and read data from a computer readable medium or storage product such as computer readable storage media 662. Examples of suitable computer readable storage media include optical storage media such as a CD or DVD, magnetic media, or any other suitable data storage device. Media reader 660 is alternatively able to be connected to the electronic device through the USB port 628 or computer readable program code is alternatively able to be provided to the electronic device 652 through the wireless network 650.

Information Processing System

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable. A typical combination of hardware and software could be a general purpose computer system with a computer program that, when being loaded and executed, controls the computer system such that it carries out the methods described herein.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory (ROM), flash memory, disk drive memory, CD-ROM, and other permanent storage. Additionally, a computer medium may include volatile storage such as RAM, buffers, cache memory, and network circuits.

Non-Limiting Examples

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method for determining allocation of data across multiple data communications networks, comprising:
    determining, based on receiving a first data set sent from a transmitter through a first data communications network to a data receiver, a first characteristic of the first data communications network, the transmitter being remote from the data receiver;
    determining, based on receiving a second data set sent from the transmitter through a second data communications network to the data receiver, a second characteristic of the second data communication network;
    determining, at the data receiver based on determining the first characteristic and the second characteristic, an allocation of data between the first data communications network and the second communications network for sending data from the transmitter to the receiver, the allocation satisfying at least one data transfer performance requirement associated with a third data set; and
    sending, from the data receiver to the transmitter, an indication of the allocation.

2. The method of claim 1, wherein the indication comprises a respective specification of an amount of data to transfer over the first data communications network and a respective specification of an amount of data to transfer over the second data communications network.

3. The method of claim 1, wherein the first characteristic and the second characteristic comprise at least one of received data throughput rate, transmission latency, and availability.

4. The method of claim 1, wherein the at least one data transfer performance requirement comprises one of data set buffering speed, data transmission latency, data set streaming quality of service, and data transfer speed.

5. The method of claim 1, further comprising determining, prior to determining the second characteristic, an availability of the second data communications network,
    wherein the determining the second characteristic is performed based on determining the second characteristic.

6. The method of claim 1, further comprising:
   detecting, subsequent to the determining the allocation of data, a change in at least one of the first characteristic and the second characteristic;
   determining, based on detecting the change in at least one of the first characteristic and the second characteristic, a reallocation of data between the first data communications network and the second communications network, the reallocation satisfying the at least one data transfer performance requirement associated with the third data set; and
   sending, to a transmitter of the third data set, an indication of the reallocation.

7. The method of claim 1, the first data communications network using a first data communications protocol, and the second data communications network using a second data communications protocol that is different from the first data communications protocol.

8. The method of claim 7, further comprising:
   determining, prior to determining the allocation of data, an availability of a third data communications network for communications, the third data communications network being different than the first data communications network and the second data communications network and using a third data communications protocol that is different than the first data communications protocol and the second data communications protocol; and
   determining a third characteristic of the third data communication network,
   wherein the determining the allocation of data is further performed based on determining the third characteristic,
   wherein the determining the allocation of data is further based upon the third characteristic.

9. An apparatus for determining allocation of data across multiple data communications networks, the apparatus comprising:
   a data link analyzer configured to:
      determine, based on receiving a first data set sent through a first data communications network to a data receiver from a transmitter that is remote from the data receiver, a first characteristic of the first data communications network;
      determine, based on receiving a second data set sent through a second data communications network to the data receiver from the transmitter, a second characteristic of the second data communication network;
      determine, based on the first characteristic and the second characteristic, an allocation of data between the first data communications network and the second communications network for sending data from the transmitter to the data receiver, the allocation satisfying at least one data transfer performance requirement associated with a third data set; and
      send, to the transmitter of the third data set, an indication of the allocation.

10. The apparatus of claim 9, wherein the indication comprises a respective specification of an amount of data to transfer over the first data communications network and a respective specification of an amount of data to transfer over the second data communications network.

11. The apparatus of claim 9, wherein the first characteristic and the second characteristic comprise at least one of received data throughput rate, transmission latency, and availability.

12. The apparatus of claim 9, wherein the at least one data transfer performance requirement comprises one of data set buffering speed, data transmission latency, data set streaming quality of service, and data transfer speed.

13. The apparatus of claim 9, wherein the data link analyzer is further configured to determine, prior to determining the second characteristic, an availability of the second data communications network,
   wherein the determining the second characteristic is performed based on determining the second characteristic.

14. The apparatus of claim 9, wherein the data link analyzer is further configured to:
   detect, subsequent to the determining the allocation of data, a change in at least one of the first characteristic and the second characteristic;
   determine, based on detecting the change in at least one of the first characteristic and the second characteristic, a reallocation of data between the first data communications network and the second communications network, the reallocation satisfying the at least one data transfer performance requirement associated with the third data set; and
   send, to a transmitter of the third data set, an indication of the reallocation.

15. The apparatus of claim 9, wherein the first data communications network uses a first data communications protocol, and wherein the second data communications network uses a second data communications protocol that is different from the first data communications protocol.

16. The apparatus of claim 15, wherein the data receiver is further configured to:
   determine, prior to determining the allocation of data, an availability of a third data communications network for communications, the third data communications network being different than the first data communications network and the second data communications network and using a third data communications protocol that is different than the first data communications protocol and the second data communications protocol; and
   determine a third characteristic of the third data communication network, and
   wherein the data link analyzer is further configured to determine the allocation of data in further response to determining the third characteristic, and
   wherein the determining the allocation of data is further based upon the third characteristic.

17. A computer program product for determining allocation of data across multiple data communications networks, the computer program product comprising:
   a non-transitory computer readable storage medium having computer readable program code embedded therewith, the computer readable program code comprising instructions for:
   determining, based on receiving a first data set sent from a transmitter through a first data communications network to a data receiver, a first characteristic of the first data communications network, the transmitter being remote from the data receiver;
   determining, based on receiving a second data set sent from the transmitter through a second data communications network to the data receiver, a second characteristic of the second data communication network;
   determining, at the data receiver based on determining the first characteristic and the second characteristic, an allocation of data between the first data communications network and the second communications network for sending data from the transmitter to the receiver, the allocation satisfying at least one data transfer performance requirement associated with a third data set; and sending, from the data receiver to the transmitter, an indication of the allocation.

18. The computer program product of claim 17, the computer readable program code further comprising instructions for:
   determining, prior to determining the second characteristic, an availability of the second data communications network,
   wherein the determining the second characteristic is performed based on determining the second characteristic.

19. The computer program product of claim 17, the computer readable program code further comprising instructions for:
   detecting, subsequent to the determining the allocation of data, a change in at least one of the first characteristic and the second characteristic; and
   determining, based on detecting the change in at least one of the first characteristic and the second characteristic, a reallocation of data between the first data communications network and the second communications network, the reallocation satisfying the at least one data transfer performance requirement associated with the third data set; and
   sending, to a transmitter of the third data set, an indication of the reallocation.

20. The computer program product of claim 17, the first data communications network using a first data communications protocol, and the second data communications network using a second data communications protocol that is different from the first data communications protocol,
   the computer readable program code further comprising instructions for:
   determining, prior to determining the allocation of data, an availability of a third data communications network for communications, the third data communications network being different than the first data communications network and the second data communications network and using a third data communications protocol that is different than the first data communications protocol and the second data communications protocol; and
   determining, a third characteristic of the third data communication network,
   wherein the determining the allocation of data is further performed based on determining the third characteristic,
   wherein the determining the allocation of data is further based upon the third characteristic.

* * * * *